B. E. THOMAS.
FLEXIBLE SHAFT COUPLING.
APPLICATION FILED MAY 1, 1918.
1,326,993.
Patented Jan. 6, 1920.
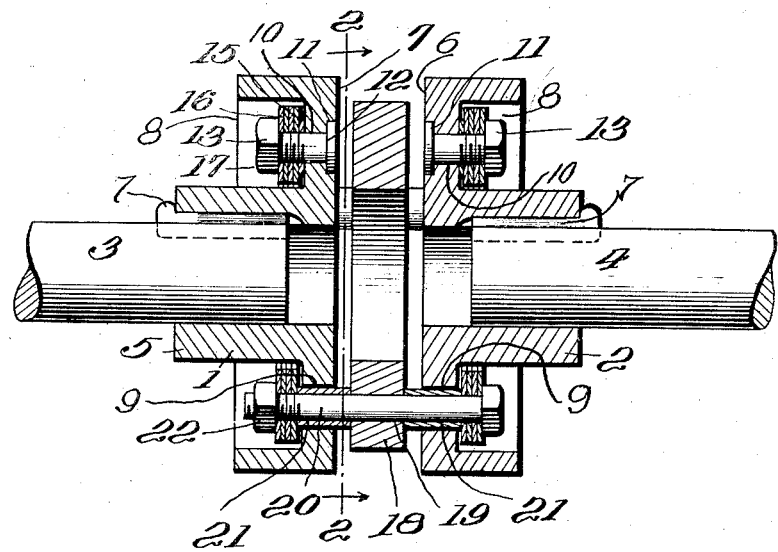

UNITED STATES PATENT OFFICE.

BERTHA E. THOMAS, OF ERIE, PENNSYLVANIA.

FLEXIBLE SHAFT-COUPLING.

1,326,993.      Specification of Letters Patent.     Patented Jan. 6, 1920.

Application filed May 1, 1918. Serial No. 231,869.

*To all whom it may concern:*

Be it known that I, BERTHA E. THOMAS, a citizen of the United States, residing at Erie, in the county of Erie and State of Pennsylvania, have invented certain new and useful Improvements in Flexible Shaft-Couplings, of which the following is a specification, reference being had therein to the accompanying drawing.

This invention relates to flexible shaft coupling, and is an improvement on my application filed March 12, 1918, Serial No. 221,892; the object being to provide a flexible shaft coupling composed of three members connected in such a manner that a positive driving connection is provided without interfering with the flexibility of the coupling whereby each section is capable of assuming an angular position without affecting the transmission of rotary movement from one to the other.

Another object of my invention is to provide a construction of coupling in which the intermediate coupling ring can be readily placed in position between the coupling heads or members or removed therefrom when said members are fixed in position upon the respective shafts.

Another and further object of my invention is to provide a construction of flexible coupling in which the members are secured together by longitudinally disposed bolts passing through the same in such a manner that a positive driving connection is produced.

Other and further objects and advantages of the invention will be hereinafter set forth and the novel features thereof defined by the appended claims.

In the drawings,

Figure 1 is a vertical longitudinal section through the complete coupling; and

Fig. 2 is a section taken on line 2—2 of Fig. 1.

Like numerals of reference refer to like parts in the several figures of the drawing.

In carrying out my invention I employ a pair of duplicate coupling members 1 and 2 which are fixed on the ends of the shafts 3 and 4 to be connected, either of which can be the driven or driving shaft. Both of these coupling members are formed exactly alike and the description of one will be sufficient for both, and are preferably formed as substantially shown in my application above referred to.

Each coupling member is provided with a hub 5 and a flat face 6, said member being preferably secured on the ends of the shaft by a key 7, as clearly shown in Fig. 1, in such a manner that there will be a space between the coupling members. The hub face of each coupling member is provided with an annular groove 8 surrounding the hub, as clearly shown in Fig. 1, and each coupling member is provided with an annular series of openings 9 and 10, the openings 9 having a diameter greater than the diameter of the openings 10. The openings 10 are surrounded at their inner ends by annular recesses 11 forming seats for the heads 12 of bolts 13 which extend into the annular recesses. The heads 12 of the bolts 13 are provided with key receiving recesses 14 in which a key can be placed for preventing the bolts from rotating within the recesses when the nuts of the bolts are being tightened, as will be later described.

The openings 9 and 10 are alternately arranged, one of the openings 10 being arranged between each pair of the openings 9, and mounted on the bolts 13 are flexible washers 15 for holding a laminated flexible ring 16 spaced from the bottom of the annular recesses of the coupling member. The laminated ring 16 is provided with openings in alinement with the openings 9 and 10 of the coupling member. The bolts 13 pass through the respective openings of the laminated ring and are secured in position by nuts 17 so as to securely fasten the ring to the coupling member in spaced relation to the walls of the annular recess, and as each of the coupling members is provided with a laminated ring secured in position thereon by bolts, each coupling member is complete in itself, and can be removed as a unit or placed in position upon the shaft, thereby eliminating the difficulties now existing in assembling flexible couplings.

Arranged between the coupling members 1 and 2, and in spaced relation thereto, is a coupling ring 18 which is provided with openings 19 in alinement with the openings 9 of the respective heads through which bolts 20 are adapted to extend, which pass through the openings of the laminated rings and are provided with sleeves 21 for holding the coupling ring 18 in its proper position between the coupling members. The inner ends of the sleeves 21 engage the coupling ring 18, and the outer ends engage the laminated rings in such a manner that when the nuts 22 are placed on the bolts and screwed into engagement with the adjacent laminated ring, the respective members of the coupling will be secured together in order to form a positive driving connection between the members. The sleeves 21 have a diameter less than the diameter of the openings 9 in order to allow a slight play, and it will be seen by this construction that the members are capable of assuming an angular position in respect to each other.

In assembling a flexible coupling, as herein shown and described, the coupling members are secured in position upon the ends of the shafts 3 and 4, and the sleeves 21 are placed in the openings 9. The coupling ring 18 is then placed between the coupling members 1 and 2 with its openings in alinement with the bores of the sleeves, and the bolt 20 is then forced through the laminated rings, sleeves, coupling ring and coupling members, and a nut is placed on the end of a bolt so as to couple the members in order to form a driving connection between the members, and as these bolts are formed of high grade steel, a driving connection is produced which will be sufficiently strong to withstand the strain to which it is subjected.

From the foregoing description it will be seen that I have provided a flexible shaft coupling formed of a pair of coupling members having laminated rings secured on the outer faces, and an intermediate coupling ring secured to said laminated rings and members by longitudinally disposed bolts passing through the respective members in such a manner that positive driving connection is produced, and a coupling is produced which will allow the members to assume an angular position in respect to each other to allow shafts which are out of alinement to be coupled.

I claim:

1. A flexible shaft coupling comprising a pair of coupling heads, laminated rings carried by said heads, a coupling ring disposed between said coupling members, and longitudinally disposed members passing through the members of the coupling for alternately connecting said coupling members and ring together and said flexible rings to said heads.

2. A flexible shaft coupling, comprising a pair of heads adapted to be secured on the ends of the shafts to be connected, flexible rings carried by the outer faces of said heads, a coupling member disposed between said heads, bolts passing through said flexible rings, heads and coupling ring for securing said members together and means for holding said members in spaced relation.

3. A flexible shaft coupling, comprising a pair of coupling members adapted to be secured to the ends of the shafts to be connected, a flexible ring arranged on the outer face of each coupling member and spaced therefrom, a coupling ring disposed between said coupling members and spaced therefrom, means for securing said rings to said members and bolts passing through the flexible rings coupling members and coupling ring for securing members and coupling ring together.

4. A flexible shaft coupling, comprising a pair of heads adapted to be secured to the ends of the shafts to be connected, a flexible ring secured on the outer face of each of said coupling members and spaced therefrom, a coupling ring disposed between said heads, and bolts passing longitudinally through said coupling heads, coupling ring and flexible rings for securing said members together.

5. A flexible shaft coupling, comprising a pair of coupling members adapted to be secured to the ends of the shafts to be connected, a flexible ring arranged on the outer face of each coupling member and spaced therefrom, a coupling ring disposed between said coupling members, a bolt passing through said flexible rings, coupling members and coupling ring, and sleeves mounted on said bolt having their inner ends in engagement with said coupling rings and their outer ends in engagement with said flexible rings.

6. A flexible shaft coupling, comprising a pair of coupling members adapted to be secured to the ends of the shafts to be connected, laminated flexible rings arranged on the outer face of each of said coupling members and spaced therefrom, bolts for securing said rings to said coupling members, a coupling ring disposed between said coupling members, bolts passing longitudinally through said flexible rings, coupling members and coupling ring, and sleeves mounted on said bolts for holding said coupling ring in spaced relation with said coupling members.

7. A flexible shaft coupling composed of three spaced members, the outside members being provided with flexible rings, and bolts extending longitudinally through said members and rings for connecting said members together.

In testimony whereof I hereunto affix my signature in the presence of two witnesses.

BERTHA E. THOMAS.

Witnesses:
 VIRGINIA THOMAS,
 GLADYS THOMAS.